United States Patent
Mudgil et al.

(10) Patent No.: US 12,282,482 B2
(45) Date of Patent: Apr. 22, 2025

(54) ENABLING REAL-TIME INTEGRATION OF UP-TO-DATE SILOED DATA

(71) Applicant: Tekion Corp, San Ramon, CA (US)

(72) Inventors: Satyavrat Mudgil, Bengaluru (IN); Justin Hou, Pleasanton, CA (US); Ved Surtani, Bengaluru (IN)

(73) Assignee: Tekion Corp, Pleasanton, CA (US)

( * ) Notice: Subject to any disclaimer, the term of this patent is extended or adjusted under 35 U.S.C. 154(b) by 363 days.

(21) Appl. No.: 17/226,308

(22) Filed: Apr. 9, 2021

(65) Prior Publication Data
US 2022/0327129 A1  Oct. 13, 2022

(51) Int. Cl.
*G06F 16/2455* (2019.01)
*G06F 16/248* (2019.01)

(52) U.S. Cl.
CPC ...... *G06F 16/24556* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 6,711,569 B1 | 3/2004 | Bushee | |
| 7,499,907 B2 | 3/2009 | Brown et al. | |
| 10,664,512 B1* | 5/2020 | He | G06N 3/045 |
| 2006/0235852 A1 | 10/2006 | Gaug | |
| 2007/0260696 A1* | 11/2007 | Bohannon | G06F 11/2023 |
| | | | 709/208 |
| 2008/0288477 A1* | 11/2008 | Kim | G06F 16/9577 |
| 2009/0150352 A1 | 6/2009 | Wang et al. | |
| 2010/0083147 A1* | 4/2010 | Gaffney | G06Q 30/02 |
| | | | 715/762 |
| 2014/0108437 A1 | 4/2014 | Brown et al. | |
| 2015/0254252 A1* | 9/2015 | Khalil | G06F 16/951 |
| | | | 707/706 |
| 2017/0317882 A1 | 11/2017 | Bitincka et al. | |
| 2019/0163679 A1* | 5/2019 | Srinivasa | G16H 50/70 |
| 2020/0334237 A1 | 10/2020 | Yousaf et al. | |

(Continued)

OTHER PUBLICATIONS

International Search Report and Written Opinion, Patent Cooperation Treaty Application No. PCT/US2022/024019, Jul. 6, 2022, 10 pages.

(Continued)

*Primary Examiner* — Yu Zhao
(74) *Attorney, Agent, or Firm* — Fenwick & West LLP

(57) ABSTRACT

A system and a method are disclosed for receiving, via a user interface, user input of a first parameter and a second parameter. The system identifies aggregations corresponding to the parameters, the aggregations updated based on input from respective sets of machines, the aggregations being siloed with respect to one another. The system transmits a first query to the first aggregation corresponding to the first parameter, and receives a first response to the first query comprising first data, and transmits a second query to the second aggregation corresponding to the second parameter, and receives a second response to the second query comprising second data. The system integrates the first data and the second data into integrated data, and provides for display, via the user interface, a representation of the integrated data.

17 Claims, 5 Drawing Sheets

(56) References Cited

U.S. PATENT DOCUMENTS

2021/0089533 A1    3/2021  Chen et al.
2021/0089959 A1*   3/2021  Ghosh .................... G06N 5/01

OTHER PUBLICATIONS

European Patent Office, Extended European Search Report and Opinion, EP Patent Application No. 22785522.8, Sep. 9, 2024, nine pages.

* cited by examiner

500

502
receive, via a user interface, user input of a first parameter and a second parameter

504
identify a first aggregation corresponding to the first parameter and a second aggregation corresponding to the second parameter, the first aggregation updated based on first input from a first set of machines, and the second aggregation updated based on second input from a second set of machines, the first set of machines and the second set of machines being exclusive of one another, the first aggregation and the second aggregation being siloed with respect to one another

506
transmit a first query to the first aggregation corresponding to the first parameter, and receiving a first response to the first query comprising first data

508
transmit a second query to the second aggregation corresponding to the second parameter, and receiving a second response to the second query comprising second data

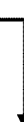

510
integrate the first data and the second data into integrated data

512
provide for display, via the user interface, a representation of the integrated data

FIG. 5

ENABLING REAL-TIME INTEGRATION OF UP-TO-DATE SILOED DATA

TECHNICAL FIELD

The disclosure generally relates to the field of database management, and more particularly relates to enabling real-time data access to data that is integrated across multiple data aggregations.

BACKGROUND

Existing tools dedicate fractured databases for different segments of users. Administrators who seek to understand data across the fractured databases thus request data individually from each database, and then manually integrate received data. This results in inefficient bandwidth consumption in making multiple inquiries, and also results in outdated data, in that should underlying data in any database be subject to change, then by the time the manual integration is performed, the integrated data no longer reflects an up-to-date set of data across the databases.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates one embodiment of a system environment of a search service servicing multiple aggregations.

FIG. 5 illustrates one embodiment of an exemplary flowchart for a process for generating and providing for display integrated data from multiple aggregations.

DETAILED DESCRIPTION

Figure 1:
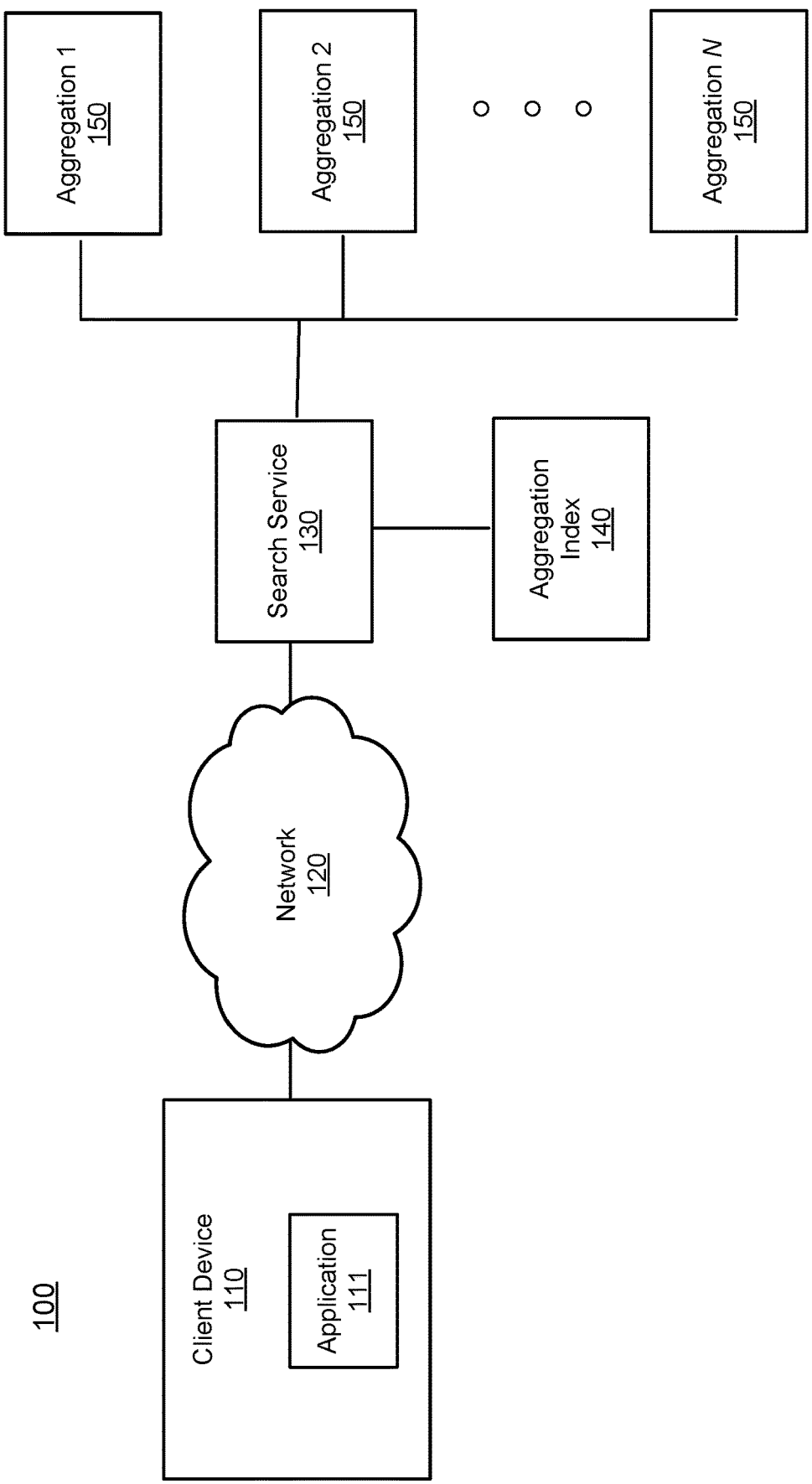

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium is disclosed herein that includes receiving, via a user interface, user input of a first parameter and a second parameter. For example, a user may request an integration of data having certain fields, the fields corresponding to data stored at disparate aggregations. The system may identify a first aggregation corresponding to the first parameter and a second aggregation corresponding to the second parameter. The first aggregation may be updated based on first input from a first set of machines, and the second aggregation may be updated based on second input from a second set of machines, the first set of machines and the second set of machines being exclusive of one another, the first aggregation and the second aggregation being siloed with respect to one another. For example, different sections of an enterprise may have dedicated aggregations that are accessed and updated by those branches and no other branches.

In an embodiment, identifying the first aggregation corresponding to the first parameter and the second aggregation corresponding to the second parameter includes querying an index of candidate aggregations for respective aggregations using the first parameter and the second parameter, and identifying the first aggregation and the second aggregation based on a result of the querying of the index. For example, the index may map different parameters to databases to which those parameters have related data that is stored.

In an embodiment, identifying the first aggregation corresponding to the first parameter may include receiving, via the user interface, a user selection of the first aggregation as corresponding to the first parameter. Identifying the second aggregation may include automatically selecting the second aggregation based on a mapping of the second parameter to the second aggregation without receiving a user selection of the second aggregation as corresponding to the second parameter. Thus, aggregations may be selected based on a combination of manual input and automatic selection.

The system may transmit a first query to the first aggregation corresponding to the first parameter and receive a first response to the first query including first data. Similarly, the system may transmit a second query to the second aggregation corresponding to the second parameter and receive a second response to the second query including second data. The system may integrate integrating the first data and the second data into integrated data, and provide for display, via the user interface, a representation of the integrated data.

In an embodiment, the receiving of the user input occurs at a first time. The system receives, at a second time within a threshold interval of time preceding the first time, an update corresponding to the first parameter from a machine of the first set of machines, and updates the first aggregation ahead of the first time to reflect the updated first parameter, where the integrating of the first data and the second data into the integrated data comprises using the updated first parameter. Updating the first aggregation ahead of the first time to reflect the updated first parameter may include providing a change log reflecting the update to the first aggregation, the change log excluding a payload with information that does not reflect the updated that relates to the first parameter. In this manner, the updating is performed in real time based on the change log, where the threshold interval may be a de minimus interval.

System Environment

Figure (FIG. 1 illustrates one embodiment of a system environment of a search service servicing multiple aggregations. As depicted in FIG. 1, environment 100 includes client device 110, application 111, network 120, search service 130, aggregation index 140, and aggregations 150. Client device 110 may be any device having a user interface operable by a user to communicate with search service 130. For example, client device 110 may be a mobile device (e.g., smartphone, laptop, tablet, personal digital assistant, wearable device, internet-of-things device, and so on), a larger device (e.g., a personal computer, kiosk, and so on), or any other device capable of operating application 111. Application 111 may be installed on client device 110, and may be used to interface a user of client device 110 with search service 130. Application 111 may be a dedicated application, provided to client device 110 via search service 130. Alternatively, application 111 may be a browser application through which a user may navigate to a portal to interface with search service 130. Application 111 may perform some or all functionality of search service 130 on-board client device 110. Further details about the functionality of application 111 will be described below with respect to search service 130.

Network 120 facilitates communication between client device 110 and search service 130. Network 120 may be any network, such as a local area network, a wideband network, the Internet, and any other type of network.

Search service 130 receives requests from client device 110 (e.g. via application 111), and accesses one or more of aggregations 150 to retrieve data that forms a part of a response to the requests from client device 110. Search service 130 may, based on user input in forming a given request, query aggregation index 140, referencing the request from the client device, to determine which aggregations to access in order to comply with the request. Further details about search service 130 will be described in detail below with reference to FIG. 2.

Aggregation index 140 is an index that maps search terms, also referred to herein as parameters, to one or more aggregations. Each aggregation may be updated based on interactivity between machines of those departments (e.g., machines operated by employees of those different departments), and updates pushed to the aggregations from the interactions. A user may enter any number of parameters into a search request. Index 140 may be used to determine, based on the mapping between candidate parameters and their respective aggregations, which of aggregations 150 are to be referenced based on the input parameters.

Aggregations 150 are data stores that store information derived from sets of machines associated with the aggregations. Aggregations 150 may be data stores housing information corresponding to different sections of a conglomerate. Each aggregation may be siloed from each other aggregation, such that no aggregation is updated by machines other than associated sets of machines, and such that no aggregation's information is accessible to any other aggregation.

Exemplary Search Service Operation

Figure 2:
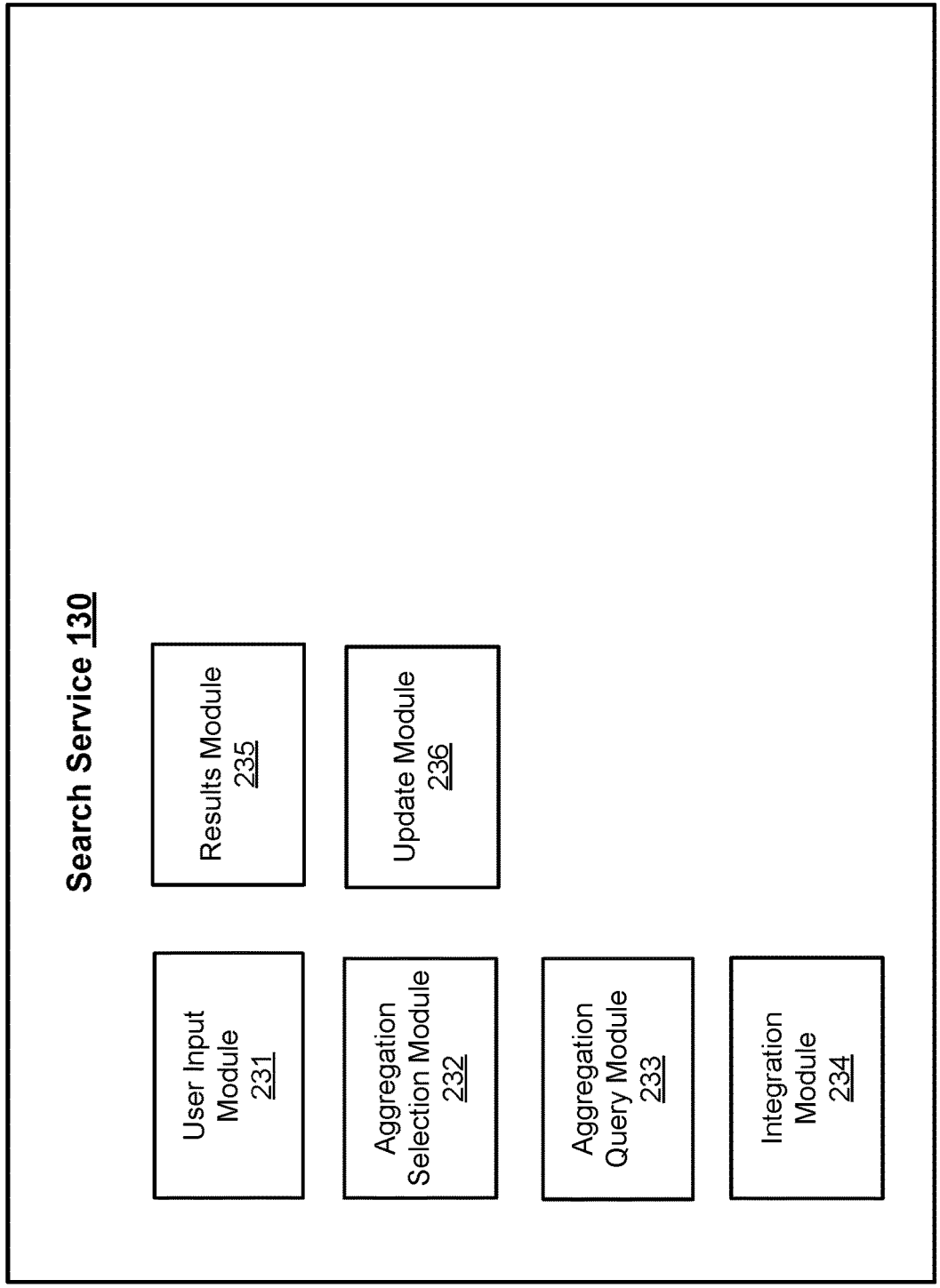
FIG. 2 illustrates one embodiment of exemplary modules used by the search service.

FIG. 2 illustrates one embodiment of exemplary modules used by the search service. As depicted in FIG. 2, search service 130 includes user input module 231, aggregation selection module 232, aggregation query module 233, integration module 234, results module 235, and update module 236. The modules of search service 130 depicted in FIG. 2 are exemplary and non-limiting; more or fewer modules may be used to carry out the functionality described herein. Moreover, the modules depicted in FIG. 2 may be integrated into application 111 and/or may have companion modules that perform counterpart client-side functionality integrated into application 111.

User input module 231 receives user input from a user in connection with initiating a search. For example, a search may be initiated to gather data for inclusion in an integration of data provided by search service 130. In one particular example, where search service 130 is providing an integration of data based on data of a conglomerate, the user may request an integration having data that is spread across different siloed departments, and search service 130 may retrieve respective data corresponding to the different departments from their respective aggregations in connection with generating the integration. The user input may include parameters that form a search request.

User input module 231 causes application 111 to output for display on client device 110 a user interface that includes fields for input by the user of parameters. The fields may accept free text, drop-down bars including candidate parameters from which a selectable option may be selected, or any other means of selecting one or more candidate parameters. The selection of a given option may lead to a menu of sub-options (e.g., selecting service may lead to sub-options of repairs and warranty, and then selecting warranty may lead to further sub-options of losses, related business, and so on).

In an embodiment, user input module 231 generates for display one or more selectable options corresponding to one or more aggregations. In an embodiment, user input module 231 outputs these selectable options by default. In another embodiment, user input module 231 outputs these selectable options responsive to detecting entry of a parameter, where the selectable options each correspond to the parameter. For example, where a parameter corresponds to two or more different aggregations (e.g., "repairs" is the parameter, a tracking section and a service section both catalog repairs), selectable options may be output corresponding to each of those aggregations. Responsive to detecting a selection of one or more of the selectable options, user input module 231 informs search service 130 to search the selected one(s) of the aggregations in gathering information for the resulting integration.

Aggregation selection module 232 selects, based on input received by user input module 231, one or more aggregations from which to retrieve results matching a user input parameter. In an embodiment, as mentioned above, an aggregation may be manually selected by a user, in which case aggregation selection module 232 selects the aggregation based on the user's input in selecting the particular aggregation for searching with respect to a given parameter. In an embodiment, aggregation selection module 232 automatically selects the aggregation without user selection. In order to perform the selection, aggregation selection module 232 identifies one or more parameters input by the user, and queries aggregation index 140. Aggregation index returns, for each parameter, a corresponding one or more of aggregations 150 that are mapped to the parameter. Where one aggregation matches, aggregation selection module 232 may select the one matching aggregation as the one from which to retrieve results matching the user input parameter.

Where two or more aggregations match, aggregation selection module 232 may select one, some, or all of the matching aggregations. In an embodiment, the matching aggregations may be ranked, and the ranking may be used by aggregation selection module 232 to select one or more of the aggregations. In order to rank the matching aggregations, heuristics and/or machine learning may be used. In terms of heuristics, the matching aggregations may be matched based on any metric. Exemplary metrics include an amount of data in each matching aggregation that relates to the parameter.

Another heuristic may be to reference a knowledge graph, the knowledge graphs including nodes that represent aggregations and parameters, and edges that connect the aggregations and parameters, where weights representing a strength of association between a connected parameter and aggregation are stored with respect to the connecting edge. In such a scenario, aggregation selection module 232 may rank the aggregations based on the weights of edges connecting those aggregations to the matching parameter.

In terms of machine learning, a machine-learned model may be applied to the user-input one or more parameters, and the model may output either probabilities that correspond to a likelihood that a candidate aggregation corresponds to the parameter, or a direct output of one or more aggregations that correspond to the parameter (and thus that should be selected and searched). In the event that the model outputs probabilities, in an embodiment, the probabilities may be ranked, and a pre-defined number (e.g., one, two, or more) or percentage (e.g., the top 10%) of the candidate aggregations may be selected by aggregation selection module 232. In such an embodiment, exclusions may be applied (e.g., a candidate aggregation must have at least a threshold probability associated with it, such as 51%). In an event that the model outputs a direct identification of one or more corresponding aggregations, aggregation selection module 232 may select those identified one or more aggregations.

The machine learning model may be a supervised model or an unsupervised model. Where the model is a supervised model, training data may be derived manually, or automatically. Automatic training data may be derived based on historical manual selections of aggregations in connection with user-input parameters, where the model (e.g., a neural network or other deep learning network) increases an association between the parameter and the selected aggregation wherever such training data is encountered. Where the model is an unsupervised model, a clustering algorithm or nearest neighbor algorithm may be performed that, based on user inputs, determines a closest cluster of historical selections of aggregations, where the closest cluster's associated aggregations are selected by aggregation selection module 232.

Aggregation query module 233 queries the one or more matching aggregations 150 for data corresponding to the user-input parameters. For example, aggregation query module 233 transmits a request to each selected aggregation 150, the respective requests including identification of the parameter(s) used as a basis for selecting the matching aggregation. Aggregation query module 233 receives, in response to the queries, data for inclusion in an integration of data.

Integration module 234 collates the data received from the various aggregations into a data integration. Collation may include unifying the data into a single data structure, cleaning up the data (e.g., de-duplicating the data), and otherwise formatting the data into a pre-determined structure. Results module 235 outputs the integrated data to client device 110 via application 111. Results module 235 may receive requests for operations to be performed on the integrated data (e.g., re-format the presentation of the data; perform mathematical operations on different portions of the data, surface more granular pieces of a given piece of data, and so on), and may update the user interface to reflect what is requested.

Update module 236 ensures that the results output by results module 235 are current, such that integrations requested by users are up-to-date with real-time information. For example, update module 236 may detect that a change has occurred to underlying data within an aggregation, and propagates that change to the aggregation in a short period of time (e.g., seconds). In order to ensure that data can be updated in real time, rather than receive and propagate full new copies of updates, update module 236 detects a change responsive to detecting a change log. The term change log, as used here, refers to a file the represents a delta between a file as it was, and a file as it has become, based on a modification the file. Change logs are at least an order of magnitude smaller than full files, and thus when used in this manner, save on network bandwidth and reduce latency, as well as necessary memory and processing power to effect an update. In the aggregate, where many changes are made at once to many files across an enterprise, the processing power and network resources saved using change logs, rather than propagating full files, are dramatically lessened. Moreover, due to the lessening of use of these resources, real-time or near real-time updates are possible, thus enabling a change that happens just moments before a data is requested to be reflected in the integration.

Figure 3:
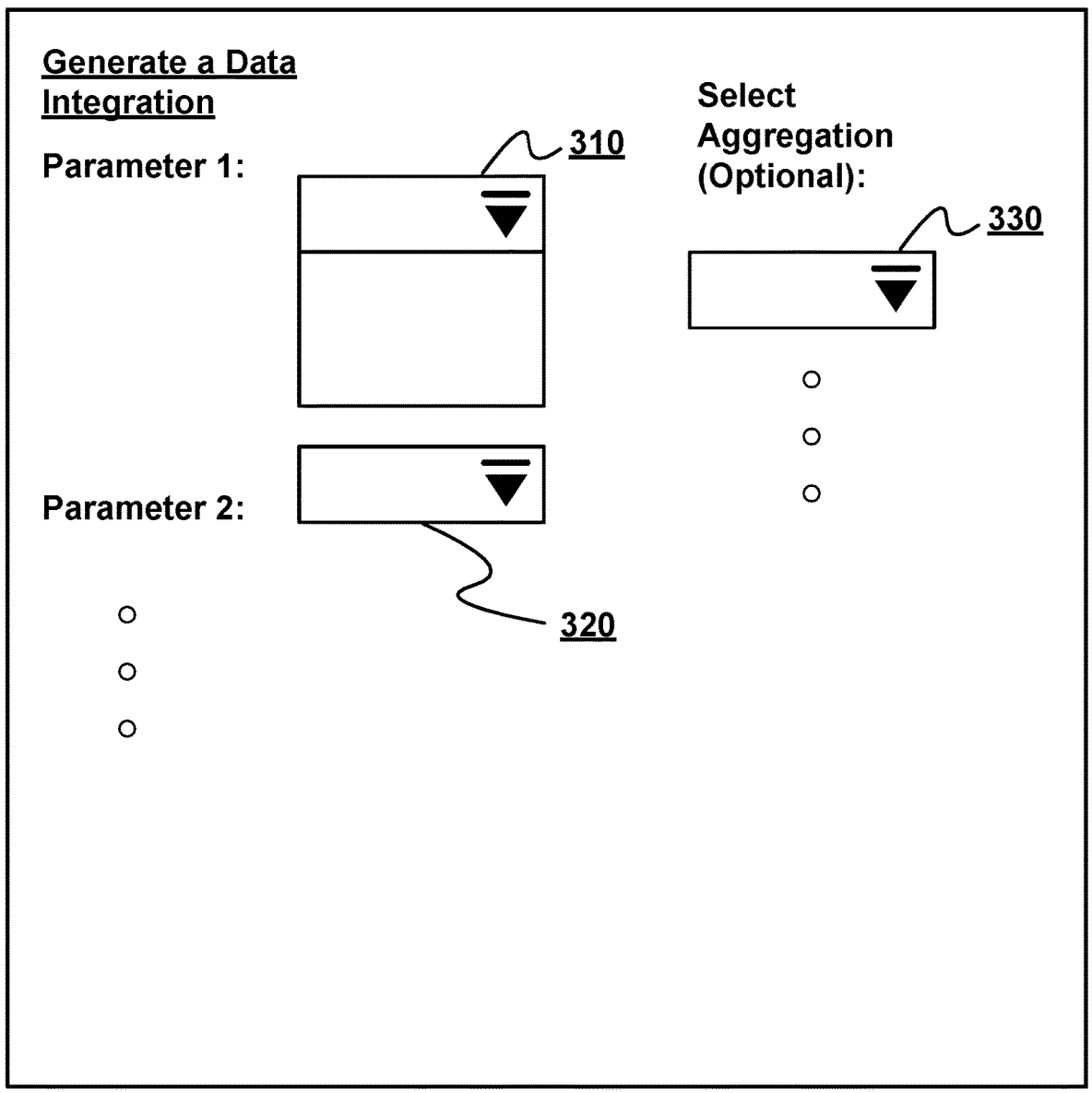
FIG. 3 illustrates one embodiment of a user interface operable by a client device to communicate information to the search service.

FIG. 3 illustrates one embodiment of a user interface operable by a client device to communicate information to the search service. User interface 300 depicts parameter option 310, parameter option 320, and aggregation selection option 330. Parameter options 310 and 320 are depicted as drop-down menus from which a parameter selection may be made, though any parameter selection action may be made consistent with the description of FIG. 2. Similarly, aggregation selection option 330 (indicated as optional), is depicted as a drop down menu, but the aggregation selection may be indicated using any manner discussed in the foregoing. Following selecting parameters and, optionally, aggregations, the user may initiate a data integration generation process (e.g., by selecting a "start" option, not depicted).

Computing Machine Architecture

Figure 4:
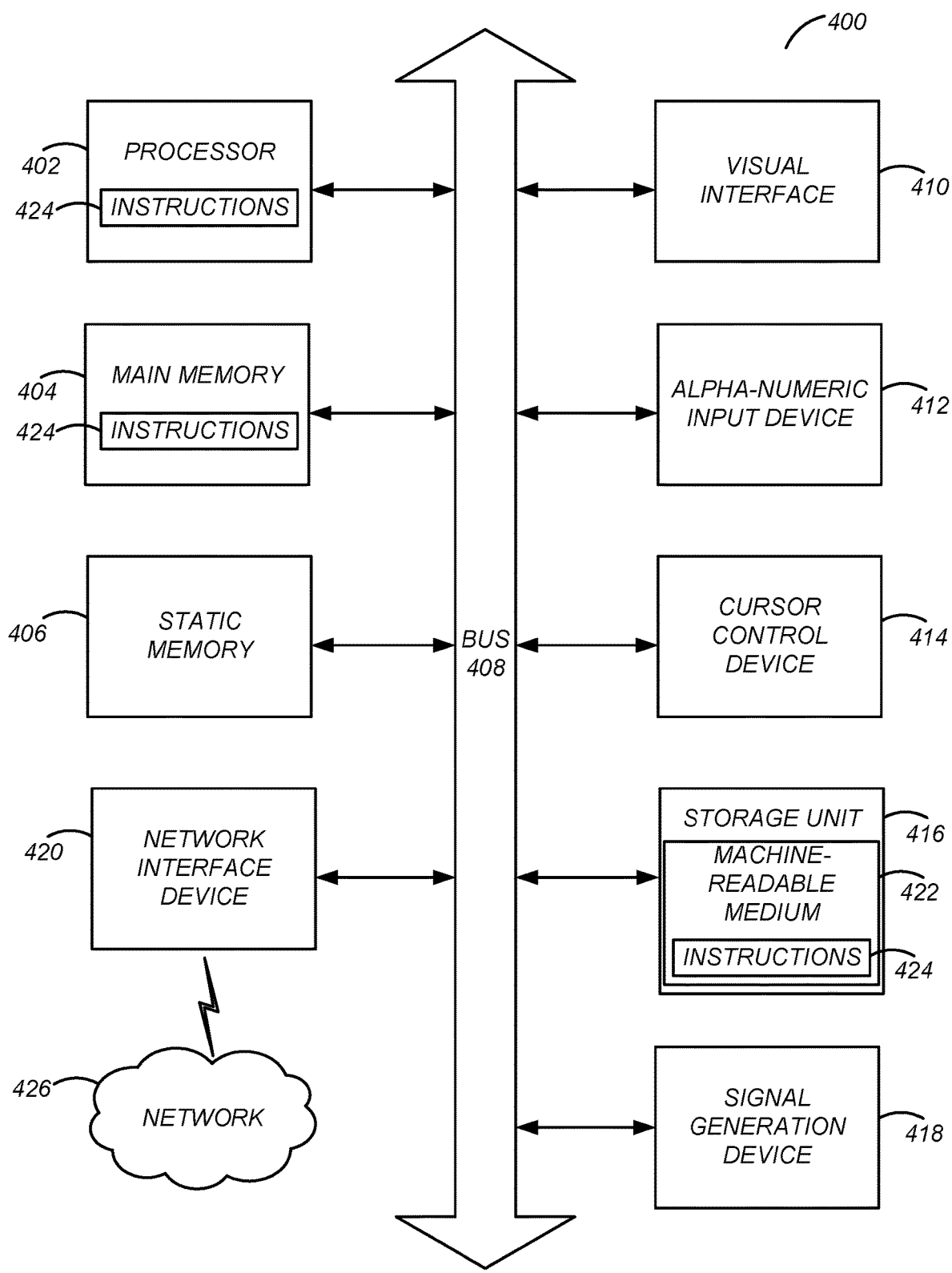
FIG. 4 is a block diagram illustrating components of an example machine able to read instructions from a machine-readable medium and execute them in a processor (or controller).

FIG. 4 is a block diagram illustrating components of an example machine able to read instructions from a machine-readable medium and execute them in a processor (or controller). Specifically, FIG. 4 shows a diagrammatic representation of a machine in the example form of a computer system 400 within which program code (e.g., software) for causing the machine to perform any one or more of the methodologies discussed herein may be executed. The program code may be comprised of instructions 424 executable by one or more processors 402. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include visual display interface 410. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 410 may include or may interface with a touch enabled screen. The computer system 400 may also include alphanumeric input device 412 (e.g., a keyboard or touch screen keyboard), a cursor control device 414 (e.g., a mouse, a trackball, a joystick, a motion sensor, or other pointing instrument), a storage unit 416, a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Exemplary Integration Generation Process

FIG. 5 illustrates one embodiment of an exemplary flowchart for a process for generating and providing for display integrated data from multiple aggregations. Process 500 begins with search service 130 receiving 502, via a user interface, user input of a first parameter and a second parameter. For example, user input module 231, executed by processor 402, may detect user input via parameter options 310 and 320 of user interface 300 (output by application 111) that indicate a first and second parameter.

Search service 130 identifies 504 a first aggregation corresponding to the first parameter (e.g., aggregation 1 of aggregations 150) and a second aggregation corresponding to the second parameter (e.g., aggregation 2 of aggregations 150), the first aggregation updated based on first input from a first set of machines, and the second aggregation updated based on second input from a second set of machines, the first set of machines and the second set of machines being exclusive of one another, the first aggregation and the second aggregation being siloed with respect to one another. Search service 130 may perform the identifying using aggregation selection module 232 in any manner described in the foregoing.

In an embodiment, identifying the aggregations includes querying an index of candidate aggregations (e.g., aggregation index 140) for respective aggregations using the first parameter and the second parameter, and identifying the first aggregation and the second aggregation based on a result of the querying of the index. In an embodiment, identifying the first aggregation includes receiving, via the user interface, a user selection of the first aggregation as corresponding to the first parameter. For example, user input module 231 receives input of an aggregation selection via aggregation selection option 330 with respect to the first parameter (e.g., input via parameter option 310). Manual selection of one aggregation, and automatic selection of another aggregation, may be performed in the context of a single search request. For example, identifying the second might include automatically select the second aggregation based on a mapping of the second parameter to the second aggregation without receiving a user selection of the second aggregation as corresponding to the second parameter, notwithstanding that the first aggregation was manually selected by the user. The terms first and second are not meant to imply an order, and are merely used for convenience.

Search service 130 transmits 506 a first query to the first aggregation corresponding to the first parameter, and receives a first response to the first query comprising first data. Search service 130 also transmits 508 a second query to the second aggregation to the second parameter, and receives a second response to the second query comprising second data. These queries may be performed using aggregation query module 233.

Search service 130 integrates 510 the first data and the second data into integrated data (e.g., using integration module 234), and provides for display 512, via the user interface, a representation of the integrated data (e.g., using results module 235). The representation may be an integration that is manipulatable by an operator of client device 110 to show any data retrieved from any aggregation in any form useful to the operator. The integration may reflect real-time data, as facilitated by using change logs in the manners described in the foregoing.

Additional Configuration Considerations

The systems and methods disclosed herein improve upon existing systems for generating and tracking integrations of data. Rather than having to retrieve data for integrations from disparate databases and then manually integrate that data, which requires unnecessary bandwidth and processing power in making repeated unnecessary calls to these databases, and also expends time in manual processing that causes a unified data integration to become outdated, the systems and methods disclosed herein achieve a unified set of data that is efficiently integrated, and reflects real-time updates. This is facilitated by enabling a user to select parameters from fields across multiple databases and enabling an identification of appropriate aggregations from which to retrieve data corresponding to those parameters.

The system may record every event from every set of machines (e.g., machines in different sections). These events each become coded. For example, events might include logs of activities that occur which may include a change in status. As each event happens, a change log is generated, where the change in a prior status (is what is recorded, thus achieving the ability to keep data up-to-date in real time and reduce bandwidth and processing constraints.

Additionally, scalability challenges are resolved using the systems and methods described herein. Existing systems store all data in a warehouse that stores a huge amount of data that is impractical to query each time an integration is requested. Siloed aggregations, as implemented herein, enable a warehouse of data to feed into smaller slices of data within these aggregation, thus enabling, no matter how much data is in the warehouse that might potentially be searched, a search to be performed on a general parameter that is indicated within a manageable subset of the data. Therefore, the aggregations (e.g., aggregations 150) disclosed herein and their tie-in to the search service 130 enable the search function to scale over any size of data.

Scalability can be achieved through even larger integrations. For example, the systems and methods disclosed herein may apply to a conglomerate that manages multiple other conglomerates. Status data might in such a scenario traverse across multiple conglomerates and other affected parties. Using siloed aggregations enables an administrator of the conglomerate to generate integrations that cover isolated managed conglomerates depending on the need of the conglomerate, while avoiding compromising the ability of the data to be current and up-to-date in the integration.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for operating a search service across separately siloed aggregations through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable medium comprising memory with instructions encoded thereon, the instructions, when executed, causing one or more processors to perform operations, the instructions comprising instructions to:

receive, via a user interface, user input of a first parameter and a second parameter, the first parameter and the second parameter each being search terms, the user input comprising a search request;

identify a first aggregation of a conglomerate corresponding to the first parameter and a second aggregation of the conglomerate corresponding to the second parameter using an index that maps the search terms to their respective aggregations, the first aggregation updated based on first input from a first set of machines of the conglomerate, and the second aggregation updated based on second input from a second set of machines of the conglomerate, the first set of machines and the second set of machines being exclusive of one another, the first aggregation and the second aggregation being siloed with respect to one another where the first aggregation is not updated based on the second input, and the second aggregation is not updated based on the first input, wherein the instructions to identify the second aggregation comprise instructions to automatically select the second aggregation based on a mapping of the second parameter to the second aggregation without receiving a user selection of the second aggregation as corresponding to the second parameter, and wherein the second aggregation is identified as part of a set of second aggregations by:

inputting the second parameter into a machine learning model;

receiving, as output from the machine learning model, a plurality of candidate aggregations as ranked with their likelihood of matching the second parameter; and selecting, from the plurality of candidate aggregations, the second set of aggregations including the second aggregation and a third aggregation from a third set of machines of the conglomerate, wherein selecting, from the plurality of candidate aggregations, the second set of aggregations is based on the second aggregation and the third aggregation being ranked as within a threshold of top ranking ones of the plurality of candidate aggregations as ranked with their likelihood of matching the second parameter;

perform, in response to the search request, a search within data of the conglomerate, the search including:

transmitting a first query to the first aggregation and not to the second aggregation and not to the third aggregation, the first query corresponding to the first parameter;

receiving a first response to the first query comprising first data;

transmitting a second query to the second aggregation and the third aggregation and not to the first aggregation, the second query corresponding to the second parameter; and receiving a second response to the second query comprising second data;

integrate the first data and the second data into integrated data; and provide for display, via the user interface, a representation of the integrated data in the data integration.

2. The non-transitory computer-readable medium of claim 1, wherein the instructions to identify the first aggregation corresponding to the first parameter and the second aggregation corresponding to the second parameter comprise instructions to:

query an index of candidate aggregations for respective aggregations using the first parameter and the second parameter; and identify the first aggregation and the second aggregation based on a result of the querying of the index.

3. The non-transitory computer-readable medium of claim 1, wherein the instructions to identify the first aggregation corresponding to the first parameter comprise instructions to receive, via the user interface, a user selection of the first aggregation as corresponding to the first parameter.

4. The non-transitory computer-readable medium of claim 1, wherein the receiving of the user input occurs at a first time, and wherein the instructions further comprise instructions to:

receive, at a second time within a threshold interval of time preceding the first time, an update corresponding to the first parameter from a machine of the first set of machines; and update the first aggregation ahead of the first time to reflect the updated first parameter, wherein the integrating of the first data and the second data into the integrated data comprises using the updated first parameter.

5. The non-transitory computer-readable medium of claim 4, wherein the instructions to update the first aggregation ahead of the first time to reflect the updated first parameter comprise instructions to provide a change log reflecting the update to the first aggregation, the change log excluding a payload with information that does not reflect the updated that relates to the first parameter.

6. The non-transitory computer-readable medium of claim 5, wherein the updating is performed in real time based on the change log.

7. A method comprising:

receiving, via a user interface, user input of a first parameter and a second parameter, the first parameter and the second parameter each being search terms, the user input comprising a search request;

identifying a first aggregation of a conglomerate corresponding to the first parameter and a second aggregation of the conglomerate corresponding to the second parameter using an index that maps the search terms to their respective aggregations, the first aggregation updated based on first input from a first set of machines of the conglomerate, and the second aggregation updated based on second input from a second set of machines of the conglomerate, the first set of machines and the second set of machines being exclusive of one another, the first aggregation and the second aggregation being siloed with respect to one another where the first aggregation is not updated based on the second input, and the second aggregation is not updated based on the first input, wherein identifying the second aggregation comprises automatically selecting the second aggregation based on a mapping of the second parameter to the second aggregation without receiving a user selection of the second aggregation as corresponding to the second parameter, and wherein the second aggregation is identified as part of a set of second aggregations by:

inputting the second parameter into a machine learning model;

receiving, as output from the machine learning model, a plurality of candidate aggregations as ranked with their likelihood of matching the second parameter; and selecting, from the plurality of candidate aggregations, the second set of aggregations including the second aggregation and a third aggregation from a third set of machines of the conglomerate, wherein selecting, from the plurality of candidate aggregations, the second set of aggregations is based on the second aggregation and the third aggregation being ranked as within a threshold of top ranking ones of the plurality of candidate aggregations as ranked with their likelihood of matching the second parameter;

performing, in response to the search request, a search within data of the conglomerate, the search including:

transmitting a first query to the first aggregation and not to the second aggregation and not to the third aggregation, the first query corresponding to the first parameter;

receiving a first response to the first query comprising first data;

transmitting a second query to the second aggregation and the third aggregation and not to the first aggregation, the second query corresponding to the second parameter; and receiving a second response to the second query comprising second data;

integrating the first data and the second data into integrated data; and providing for display, via the user interface, a representation of the integrated data.

8. The method of claim 7, wherein identifying the first aggregation corresponding to the first parameter and the second aggregation corresponding to the second parameter comprises:

querying an index of candidate aggregations for respective aggregations using the first parameter and the second parameter; and identifying the first aggregation and the second aggregation based on a result of the querying of the index.

9. The method of claim 7, wherein identifying the first aggregation corresponding to the first parameter comprises receiving, via the user interface, a user selection of the first aggregation as corresponding to the first parameter.

10. The method of claim 7, wherein the receiving of the user input occurs at a first time, and wherein the method further comprises:
receiving, at a second time within a threshold interval of time preceding the first time, an update corresponding to the first parameter from a machine of the first set of machines; and
updating the first aggregation ahead of the first time to reflect the updated first parameter, wherein the integrating of the first data and the second data into the integrated data comprises using the updated first parameter.

11. The method of claim 10, wherein updating the first aggregation ahead of the first time to reflect the updated first parameter comprises providing a change log reflecting the update to the first aggregation, the change log excluding a payload with information that does not reflect the updated that relates to the first parameter.

12. The method of claim 11, wherein the updating is performed in real time based on the change log.

13. A system comprising:
memory with instructions encoded thereon; and
one or more processors that, when executing the instructions, are caused to perform operations, the operations comprising:
receiving, via a user interface, user input of a first parameter and a second parameter, the first parameter and the second parameter each being search terms, the user input comprising a search request;
identifying a first aggregation of a conglomerate corresponding to the first parameter and a second aggregation of the conglomerate corresponding to the second parameter using an index that maps the search terms to their respective aggregations, the first aggregation updated based on first input from a first set of machines of the conglomerate, and the second aggregation updated based on second input from a second set of machines of the conglomerate, the first set of machines and the second set of machines being exclusive of one another, the first aggregation and the second aggregation being siloed with respect to one another where the first aggregation is not updated based on the second input, and the second aggregation is not updated based on the first input, wherein identifying the second aggregation comprises automatically selecting the second aggregation based on a mapping of the second parameter to the second aggregation without receiving a user selection of the second aggregation as corresponding to the second parameter, and wherein the second aggregation is identified as part of a set of second aggregations by:
inputting the second parameter into a machine learning model;
receiving, as output from the machine learning model, a plurality of candidate aggregations as ranked with their likelihood of matching the second parameter; and
selecting, from the plurality of candidate aggregations, the second set of aggregations including the second aggregation and a third aggregation from a third set of machines of the conglomerate, wherein selecting, from the plurality of candidate aggregations, the second set of aggregations is based on the second aggregation and the third aggregation being ranked as within a threshold of top ranking ones of the plurality of candidate aggregations as ranked with their likelihood of matching the second parameter;
performing, in response to the search request, a search within data of the conglomerate, the search including:
transmitting a first query to the first aggregation and not to the second aggregation and not to the third aggregation, the first query corresponding to the first parameter;
receiving a first response to the first query comprising first data;
transmitting a second query to the second aggregation and the third aggregation and not to the first aggregation, the second query corresponding to the second parameter; and
receiving a second response to the second query comprising second data;
integrating the first data and the second data into integrated data; and
providing for display, via the user interface, a representation of the integrated data.

14. The system of claim 13, wherein identifying the first aggregation corresponding to the first parameter and the second aggregation corresponding to the second parameter comprises:
querying an index of candidate aggregations for respective aggregations using the first parameter and the second parameter; and
identifying the first aggregation and the second aggregation based on a result of the querying of the index.

15. The system of claim 13, wherein identifying the first aggregation corresponding to the first parameter comprises receiving, via the user interface, a user selection of the first aggregation as corresponding to the first parameter.

16. The system of claim 13, wherein the receiving of the user input occurs at a first time, and wherein the operations further comprise:
receiving, at a second time within a threshold interval of time preceding the first time, an update corresponding to the first parameter from a machine of the first set of machines; and
updating the first aggregation ahead of the first time to reflect the updated first parameter, wherein the integrating of the first data and the second data into the integrated data comprises using the updated first parameter.

17. The system of claim 16, wherein updating the first aggregation ahead of the first time to reflect the updated first parameter comprises providing a change log reflecting the update to the first aggregation, the change log excluding a payload with information that does not reflect the updated that relates to the first parameter.

\* \* \* \* \*